(12) United States Patent
Zhu et al.

(10) Patent No.: US 12,648,576 B2
(45) Date of Patent: Jun. 9, 2026

(54) METHOD FOR PREPARING LINSEED FOOD PRODUCT FROM LINSEED

(71) Applicant: ANHUI NONG ANKANG FOODS LIMITED COMPANY, Chaohu (CN)

(72) Inventors: Hao Zhu, Chaohu (CN); Benxi Zhu, Chaohu (CN); Qin Li, Chaohu (CN); Xiangshu Li, Chaohu (CN)

(73) Assignee: ANHUI NONG ANKANG FOODS LTD COMPANY, Chaohu (CN)

( * ) Notice: Subject to any disclaimer, the term of this patent is extended or adjusted under 35 U.S.C. 154(b) by 409 days.

(21) Appl. No.: 18/273,288

(22) PCT Filed: Jul. 15, 2022

(86) PCT No.: PCT/CN2022/105861
§ 371 (c)(1),
(2) Date: Jul. 20, 2023

(87) PCT Pub. No.: WO2023/284846
PCT Pub. Date: Jan. 19, 2023

(65) Prior Publication Data
US 2024/0081349 A1 Mar. 14, 2024

(30) Foreign Application Priority Data
Jul. 15, 2021 (CN) .......................... 202110801356.5

(51) Int. Cl.
*A21D 2/26* (2006.01)
*A21D 6/00* (2006.01)
(Continued)

(52) U.S. Cl.
CPC .............. *A21D 2/266* (2013.01); *A21D 6/00* (2013.01); *A21D 13/80* (2017.01); *A23J 1/14* (2013.01)

(58) Field of Classification Search
None
See application file for complete search history.

(56) References Cited

U.S. PATENT DOCUMENTS 7,842,330 B2 * 11/2010 Green .................. C07K 14/415
426/507

FOREIGN PATENT DOCUMENTS

CN 1053734 A 8/1991
CN 104430773 A 3/2015
(Continued)

OTHER PUBLICATIONS

Chen et al., "Effects of conditioning parameters on water soluble protein content in cold-pressed linseed cake" China Oils and Fats, Dec. 20, 2012, 37(12):21-25, College of Food Science and Technology, Zhengzhou, China.
(Continued)

*Primary Examiner* — Lien T Tran
(74) *Attorney, Agent, or Firm* — Ming Jiang; OPENPTO US LLC

(57) ABSTRACT

A method for preparing a linseed food product includes pulverizing linseed cake into powder and dissolving it in water. A neutral salt is added to the solution to precipitate proteins, forming a protein layer. The supernatant is discarded, and the remaining protein layer is centrifuged. Flour, starch, sugar, and egg white are added to the separated protein to form a dough. The dough is molded, fried at 140° C. to 160° C. for 2 to 6 minutes, and then baked at 200° C. for 8 to 15 minutes. This process creates a shelf-stable linseed-based snack with specific nutritional properties.

17 Claims, 1 Drawing Sheet

(51) Int. Cl.
     *A21D 13/80*      (2017.01)
     *A23J 1/14*       (2006.01)

(56)                References Cited

FOREIGN PATENT DOCUMENTS

| | | |
|---|---|---|
| CN | 107047701 A | 8/2017 |
| CN | 113598213 A | 11/2021 |

OTHER PUBLICATIONS

International Search Report and Written Opinion for PCT Appl. No. PCT/CN2022/105861, mailed Sep. 20, 2022.
Liu et al., "Advances in nutrients extraction, functions and applications of flaxseed", China Oils and Fats, Mar. 20, 2020, 45(3):90-97, College of Food Science and Engineering, Shaanxi, China.

* cited by examiner

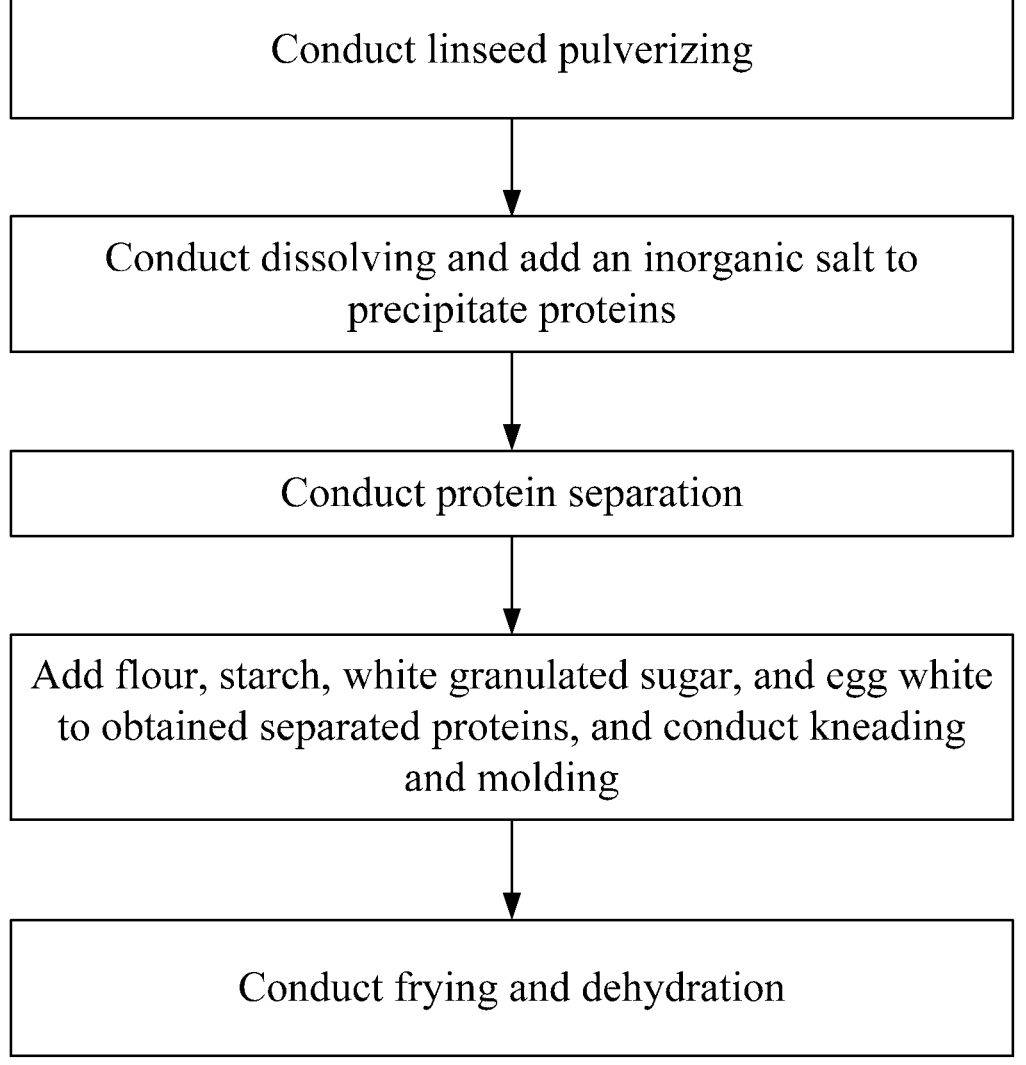

METHOD FOR PREPARING LINSEED FOOD PRODUCT FROM LINSEED

CROSS REFERENCE TO RELATED APPLICATION

The present application is a national stage application of International Patent Application No. PCT/CN2022/105861, filed on Jul. 15, 2022, which claims priority to the Chinese Patent Application No. 202110801356.5, filed with the China National Intellectual Property Administration (CNIPA) on Jul. 15, 2021, and entitled "METHOD FOR PREPARING LINSEED MERINGUE FROM LINSEED", which is incorporated herein by reference in its entirety.

TECHNICAL FIELD

The present disclosure relates to the technical field of linseed meringue preparation, and in particular relates to a method for preparing a linseed food product from linseed.

BACKGROUND

Meringues can be eaten as is or stored in an airtight freezer for at least one week. The meringues can be molded into a variety of shapes.

The existing meringues are extremely loose and easy to drop crumbs. Moreover, the current preparation methods have relatively complicated steps, require specific tools, and are inefficient.

SUMMARY

An objective of the present disclosure is to provide a method for preparing a linseed food product from linseed. The present disclosure aims to solve the problems that the existing meringues are extremely loose and easy to drop crumbs. Moreover, the current preparation methods have relatively complicated steps, require specific tools, and are inefficient.

To achieve the above objective, the present disclosure provides the following technical solutions. The present disclosure provides a method for preparing a linseed meringue from linseed, including the following steps:

S1: conducting linseed pulverizing: washing the linseed, pressing oil from washed linseed using an oil press, obtaining an oil-pressed linseed cake, and pulverizing the linseed cake into powder;

S2: conducting dissolving and adding an inorganic salt to precipitate proteins: collecting and dissolving the powder obtained in step S1 with water, and stirring continuously during the dissolving to obtain a solution;

conducting filtration on the solution to remove insoluble portions of the powder in the solution; and adding a neutral salt into an obtained filtered solution, such that proteins are precipitated to form a protein layer at a bottom of the filtered solution;

S3: conducting protein separation: directly discarding a supernatant of the solution, until a liquid level of a remaining solution is 2 cm to 3 cm away from the protein layer at the bottom; and collecting and transferring the remaining solution and the protein layer into a centrifuge, and conducting centrifugation to obtain a separated protein layer;

S4: adding flour, starch, white granulated sugar, and egg white to separated proteins, and conducting kneading and molding: adding the flour, the starch, the white granulated sugar, and the egg white into the separated protein layer obtained in step S3, adding water into an obtained mixture and kneading to form a dough, and pressing the dough into a desired shape by a molding die to obtain a molded uncooked dough; and S5: conducting frying and dehydration: cooking oil until an oil temperature is 140° C. to 160° C., and frying the molded uncooked dough in the oil for 2 min to 6 min; taking out an obtained molded fried dough, and drying the oil to obtain a semi-finished product; and baking the semi-finished product in an oven at 200° C. for 8 min to 15 min to obtain a finished product linseed meringue.

Preferably, in step S1, a large amount of fat components in the linseed are extruded by the oil press in an oil pressing process; and in the oil pressing process, the washed linseed is heated at 50° C. to 60° C.

Preferably, in step S1, a process of the linseed pulverizing includes: subjecting the linseed cake to heating, stirring, and pulverizing by a stirring device at 40° C. to 45° C. for 40 min to 50 min, sieving, conducting filtration on large-particle materials in an obtained pulverized linseed cake, and continuing pulverizing the large-particle materials.

Preferably, in step S2, the neutral salt is ammonium sulfate; and a temperature and a pH value of the solution are simultaneously controlled, the solution is set to 0° C. to 5° C.; and the solution has a set pH value equal to an isoelectric point of the proteins of the linseed.

Preferably, in step S4, in parts by mass, there are 10 parts to 20 parts of the protein layer, 10 parts to 20 parts of the flour, 10 parts to 20 parts of the starch, 10 parts to 15 parts of the white granulated sugar, 20 parts to 40 parts of the egg white, and 30 parts to 60 parts of water.

Preferably, a leavening agent is further added to the protein layer, the flour, the starch, the white granulated sugar, and the egg white.

Compared with the prior art, the present disclosure achieves following beneficial effects:

1) In the present disclosure, raw materials such as a protein layer, flour, starch, white granulated sugar, and egg white are selected, such that a finished linseed meringue has overall crispness and is not easy to loosen and drop crumbs.

2) The method has a relatively simple process and a high efficiency in preparing finished products.

3) By combining frying and baking, the meringue has a significantly improved taste.

BRIEF DESCRIPTION OF THE DRAWINGS

FIG. 1 shows a process flow diagram of the method of the present disclosure.

DETAILED DESCRIPTION OF THE EMBODIMENTS

The technical solutions of the embodiments of the present disclosure are clearly and completely described below with reference to the drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the description of the present disclosure, it should be understood that orientation or position relationships indicated by terms such as "upper", "lower", "front", "rear", "left", "right", "top", "bottom", "inside" and "outside" are based on what are illustrated in the drawings. These terms are merely intended to facilitate and simplify the description of the present disclosure, rather than to indicate or imply that the mentioned device or components must have a specific orientation or must be constructed and operated in a specific orientation. Therefore, these terms should not be understood as a limitation to the present disclosure.

Example 1

Referring to FIG. 1, the present disclosure provided a method for preparing a linseed food product from linseed, including the following steps:

S1: conducting linseed pulverizing: the linseed was washed, a large amount of fat components in the linseed were extruded by oil pressing using an oil press; and in the oil pressing process, the washed linseed was heated at 50° C.; an oil-pressed linseed cake was obtained, and the linseed cake was pulverized into powder;

a process of the linseed pulverizing included: the linseed cake was subjected to heating, stirring, and pulverizing by a stirring device at 40° C. for 40 min, sieved, filtering was conducted on large-particle materials in an obtained pulverized linseed cake, and pulverizing the large-particle materials was continued;

S2: conducting dissolving and adding an inorganic salt to precipitate proteins: the powder obtained in step S1 was collected and dissolved with water, and stirred continuously during the dissolving to obtain a solution;

filtering was conducted on the solution to remove insoluble portions of the powder in the solution; and a neutral salt ammonium sulfate was added into a filtered solution; and a temperature and a pH value of the solution were simultaneously controlled, the solution was set to 0° C.; and the solution had a set pH value equal to an isoelectric point of proteins of the linseed, such that the proteins were precipitated to form a layer at the bottom of the solution;

S3: conducting protein separation: a supernatant of the solution was directly discarded, until a liquid level of a remaining solution is 2 cm away from the protein layer at the bottom; and the remaining solution and the protein layer were collected and transferred into a centrifuge, and centrifugation was conducted to obtain a separated protein layer;

S4: adding flour, starch, white granulated sugar, and egg white to separated proteins, and conducting kneading and molding: the flour, the starch, the white granulated sugar, and the egg white were added into the separated protein layer obtained in step S3, water was added into an obtained mixture and kneaded to form a dough, and the dough was pressed into a desired shape by a molding die to obtain a molded uncooked dough; and in parts by mass, there were 10 parts of the protein layer, 10 parts of the flour, 10 parts of the starch, 10 parts of the white granulated sugar, 20 parts of the egg white, and 30 parts of water;

a leavening agent was further added to the protein layer, the flour, the starch, the white granulated sugar, and the egg white; and S5: conducting frying and dehydration: oil was cooked until an oil temperature was 140° C., and the molded uncooked dough was fried in the oil for 2 min; an obtained molded fried dough was taken out, and the oil was dried to obtain a semi-finished product; and the semi-finished product was baked in an oven at 200° C. for 8 min to obtain a finished product linseed meringue.

Example 2

Referring to FIG. 1, the present disclosure provided a method for preparing a linseed food product from linseed, including the following steps:

S1: conducting linseed pulverizing: the linseed was washed, a large amount of fat components in the linseed were extruded by oil pressing using an oil press; and in the oil pressing process, the washed linseed was heated at 55° C.; an oil-pressed linseed cake was obtained, and the linseed cake was pulverized into powder;

a process of the linseed pulverizing included: the linseed cake was subjected to heating, stirring, and pulverizing by a stirring device at 42.5° C. for 45 min, sieved, filtering was conducted on large-particle materials in an obtained pulverized linseed cake, and pulverizing the large-particle materials was continued;

S2: conducting dissolving and adding an inorganic salt to precipitate proteins: the powder obtained in step S1 was collected and dissolved with water, and stirred continuously during the dissolving to obtain a solution;

filtering was conducted on the solution to remove insoluble portions of the powder in the solution; and a neutral salt ammonium sulfate was added into a filtered solution; and a temperature and a pH value of the solution were simultaneously controlled, dissolved to 2.5° C.; and the solution had a set pH value equal to an isoelectric point of proteins of the linseed, such that the proteins were precipitated to form a layer at the bottom of the solution;

S3: conducting protein separation: a supernatant of the solution was directly discarded, until a liquid level of a remaining solution is 2.5 cm away from the protein layer at the bottom; and the remaining solution and the protein layer were collected and transferred into a centrifuge, and centrifugation was conducted to obtain a separated protein layer;

S4: adding flour, starch, white granulated sugar, and egg white to separated proteins, and conducting kneading and molding: the flour, the starch, the white granulated sugar, and the egg white were added into the separated protein layer obtained in step S3, water was added into an obtained mixture and kneaded to form a dough, and the dough was pressed into a desired shape by a molding die to obtain a molded uncooked dough; and in parts by mass, there were 15 parts of the protein layer, 15 parts of the flour, 15 parts of the starch, 12.5 parts of the white granulated sugar, 30 parts of the egg white, and 45 parts of water;

a leavening agent was further added to the protein layer, the flour, the starch, the white granulated sugar, and the egg white; and S5: conducting frying and dehydration: oil was cooked until an oil temperature was 150° C., and the molded uncooked dough was fried in the oil for 4 min; an obtained molded fried dough was taken out, and the oil was dried to obtain a semi-finished product; and the semi-finished product was baked in an oven at 200° C. for 11.5 min to obtain a finished product linseed meringue.

Example 3

Referring to FIG. 1, the present disclosure provided a method for preparing a linseed food product from linseed, including the following steps:

S1: conducting linseed pulverizing: the linseed was washed, a large amount of fat components in the linseed were extruded by oil pressing using an oil press; and in the oil pressing process, the washed linseed was heated at 60° C.; an oil-pressed linseed cake was obtained, and the linseed cake was pulverized into powder;

a process of the linseed pulverizing included: the linseed cake was subjected to heating, stirring, and pulverizing by a stirring device at 45° C. for 50 min, sieved, filtering was conducted on large-particle materials in an obtained pulverized linseed cake, and pulverizing the large-particle materials was continued;

S2: conducting dissolving and adding an inorganic salt to precipitate proteins: the powder obtained in step S1 was collected and dissolved with water, and stirred continuously during the dissolving to obtain a solution;

filtering was conducted on the solution to remove insoluble portions of the powder in the solution; and a neutral salt ammonium sulfate was added into a filtered solution; and a temperature and a pH value of the solution were simultaneously controlled, dissolved to 5° C.; and the solution had a set pH value equal to an isoelectric point of proteins of the linseed, such that the proteins were precipitated to form a layer at the bottom of the solution;

S3: conducting protein separation: a supernatant of the solution was directly discarded, until a liquid level of a remaining solution is 3 cm away from the protein layer at the bottom; and the remaining solution and the protein layer were collected and transferred into a centrifuge, and centrifugation was conducted to obtain a separated protein layer;

S4: adding flour, starch, white granulated sugar, and egg white to separated proteins, and conducting kneading and molding: the flour, the starch, the white granulated sugar, and the egg white were added into the separated protein layer obtained in step S3, water was added into an obtained mixture and kneaded to form a dough, and the dough was pressed into a desired shape by a molding die to obtain a molded uncooked dough; and in parts by mass, there were 20 parts of the protein layer, 20 parts of the flour, 20 parts of the starch, 15 parts of the white granulated sugar, 40 parts of the egg white, and 60 parts of water;

a leavening agent was further added to the protein layer, the flour, the starch, the white granulated sugar, and the egg white; and S5: conducting frying and dehydration: oil was cooked until an oil temperature was 160° C., and the molded uncooked dough was fried in the oil for 6 min; an obtained molded fried dough was taken out, and the oil was dried to obtain a semi-finished product; and the semi-finished product was baked in an oven at 200° C. for 15 min to obtain a finished product linseed meringue.

The foregoing examples display and describe basic principles, main features, and advantages of the present disclosure. Apparently, for a person skilled in the art, the present disclosure is not limited to details of the above example embodiments, and that the present disclosure may be implemented in other specific forms without departing from the spirit or basic features of the present disclosure. Therefore, the embodiments should be regarded as an example and non-limiting in every respect, and the scope of the present disclosure is defined by the appended claims rather than the above description, all changes falling within the meaning and scope of equivalent elements of the claims should be included in the present disclosure, and any reference numbers in the claims should not be construed as a limitation to the involved claims.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A method for preparing a linseed food product from linseed, comprising the following steps:

S1: conducting linseed pulverizing, which comprises: washing the linseed, pressing oil from washed linseed using an oil press, obtaining an oil-pressed linseed cake, and pulverizing the linseed cake into powder, S2: conducting dissolving and adding ammonium sulfate to precipitate proteins, which comprises: dissolving the powder obtained in step S1 with water, and stirring continuously during the dissolving to obtain a solution containing insoluble portions of the powder;

conducting filtration on the solution to remove the insoluble portions of the powder in the solution, resulting in a filtered solution; and adding the ammonium sulfate into the filtered solution to precipitate proteins, such that proteins are precipitated to form a protein layer at a bottom of a vessel containing the filtered solution, S3: conducting protein separation, which comprises: directly discarding a supernatant liquid of the solution contained in the vessel, until a liquid level of a remaining solution is 2 cm to 3 cm away from the protein layer at the bottom, and transferring the remaining solution and the protein layer into a centrifuge, and conducting centrifugation to obtain a separated protein layer, S4: adding flour, starch, white granulated sugar, and egg white to the separated protein layer, and conducting kneading and molding, which comprise: adding the flour, the starch, the white granulated sugar, and the egg white into the separated protein layer obtained in step S3, adding water into an obtained mixture and kneading to form a dough, and pressing the dough into a desired shape by a molding die to obtain a molded uncooked dough; and S5: conducting frying and dehydration, which comprise: cooking oil until an oil temperature is 140° C. to 160° C., and frying the molded uncooked dough in the oil for 2 min to 6 min; taking out an obtained molded fried dough, and drying the obtained molded fried dough to obtain a semi-finished product, and baking the semi-finished product in an oven at 200° C. for 8 min to 15 min to obtain a finished linseed food product.

2. The method according to claim 1, wherein in step S1, an amount of fat components in the linseed are extruded by the oil press in an oil pressing process; and in the oil pressing process, the washed linseed is heated at 50° C. to 60° C.

3. The method according to claim 2, wherein in the oil pressing process, the washed linseed is heated at 55° C. to 60° C.

4. The method according to claim 1, wherein in step S1, a process of the linseed pulverizing comprises: subjecting the linseed cake to heating, stirring, and pulverizing by a stirring device at 40° C. to 45° C. for 40 min to 50 min, sieving, conducting filtration on large-particle materials in an obtained pulverized linseed cake, and continuing pulverizing the large-particle materials.

5. The method according to claim 4, wherein the heating, the stirring, and the pulverizing on the linseed cake are conducted by the stirring device at 42.5° C. to 45° C. for 45 min to 50 min.

6. The method according to claim 1, wherein in step S2, a temperature of the filtered solution after the ammonium sulfate is added is controlled within a range from 0° C. to 5° C.: and a pH value of the filtered solution is equal to an isoelectric point of the proteins of the linseed.

7. The method according to claim 6, wherein the temperature of the filtered solution after the neutral salt is added is controlled within a range from 2.5° C. to 5° C.

8. The method according to claim 1, wherein in step S3, the supernatant liquid of the solution contained in the vessel is discarded, until the liquid level of the remaining solution is 2.5 cm to 3 cm away from the protein layer at the bottom.

9. The method according to claim 1, wherein in step S4, in parts by mass, there are 10 parts to 20 parts of the protein layer, 10 parts to 20 parts of the flour, 10 parts to 20 parts of the starch, 10 parts to 15 parts of the white granulated sugar, 20 parts to 40 parts of the egg white, and 30 parts to 60 parts of water.

10. The method according to claim 1, wherein in step S4, in parts by mass, there are 15 parts to 20 parts of the protein layer, 15 parts to 20 parts of the flour, 15 parts to 20 parts of the starch, 12.5 parts to 15 parts of the white granulated sugar, 30 parts to 40 parts of the egg white, and 45 parts to 60 parts of water.

11. The method according to claim 1, wherein a leavening agent is further added to the protein layer, the flour, the starch, the white granulated sugar, and the egg white.

12. The method according to claim 1, wherein in step S5, the oil is cooked until the oil temperature is 150° C. to 160° C., the molded uncooked dough is fried in the oil for 4 min to 6 min, and the semi-finished product is baked in the oven for 11.5 min to 15 min.

13. The method according to claim 2, wherein in step S1, a process of the linseed pulverizing comprises: subjecting the linseed cake to heating, stirring, and pulverizing by a stirring device at 40° C. to 45° C. for 40 min to 50 min, sieving, conducting filtration on large-particle materials in an obtained pulverized linseed cake, and continuing pulverizing the large-particle materials.

14. The method according to claim 3, wherein in step S1, a process of the linseed pulverizing comprises: subjecting the linseed cake to heating, stirring, and pulverizing by a stirring device at 40 C to 45° C. for 40 min to 50 min, sieving, conducting filtration on large-particle materials in an obtained pulverized linseed cake, and continuing pulverizing the large-particle materials.

15. The method according to claim 13, wherein the heating, the stirring, and the pulverizing on the linseed cake are conducted by the stirring device at 42.5° C. to 45° C. for 45 min to 50 min.

16. The method according to claim 14, wherein the heating, the stirring, and the pulverizing on the linseed cake are conducted by the stirring device at 42.5° C. to 45° C. for 45 min to 50 min.

17. The method according to claim 9, wherein in step S4, in parts by mass, there are 15 parts to 20 parts of the protein layer, 15 parts to 20 parts of the flour, 15 parts to 20 parts of the starch, 12.5 parts to 15 parts of the white granulated sugar, 30 parts to 40 parts of the egg white, and 45 parts to 60 parts of water.

* * * * *